Patented Mar. 3, 1925.

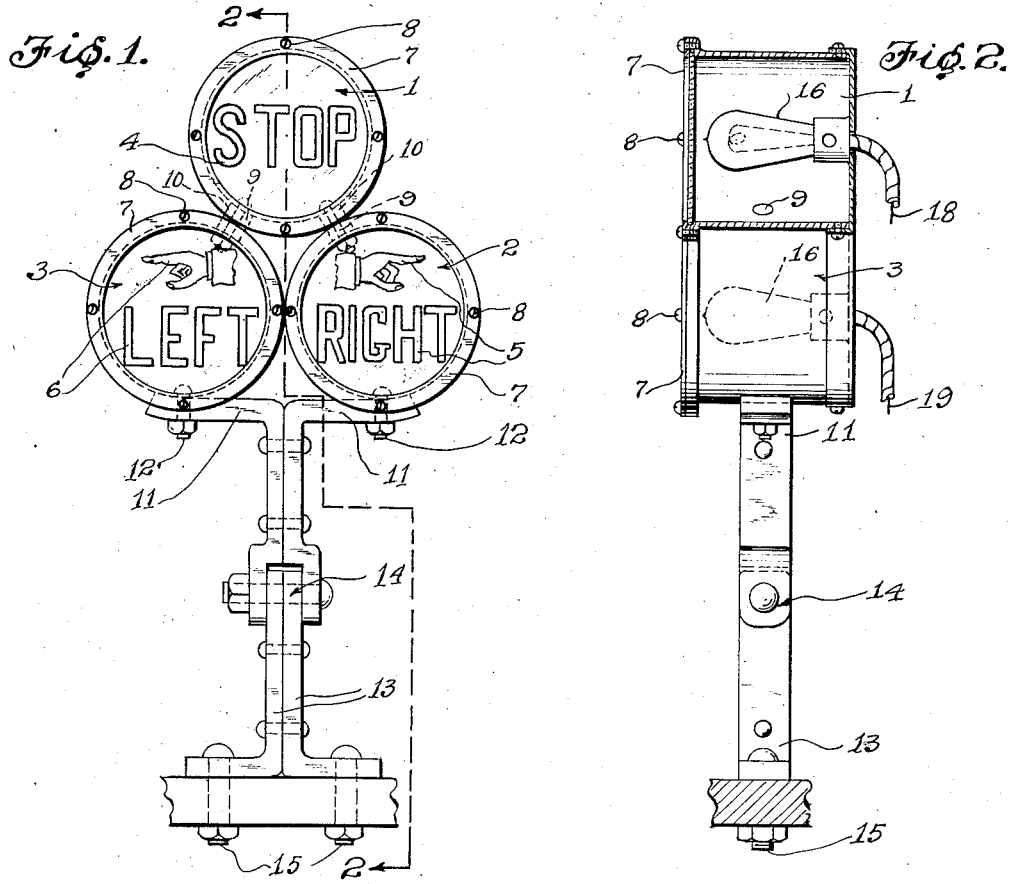

1,528,516

UNITED STATES PATENT OFFICE.

ROBERT E. TIMBERLAKE, OF LOUISVILLE, KENTUCKY.

SIGNAL-LIGHT SUPPORT.

Application filed March 8, 1923. Serial No. 623,702.

*To all whom it may concern:*

Be it known that I, ROBERT E. TIMBERLAKE, a citizen of the United States, and resident of Louisville, in the county of Jefferson and State of Kentucky, have invented new and useful Improvements in a Signal-Light Support, of which the following is a specification.

The object of my invention is to provide a novel light support for a rear signal light for motor vehicles and for any other suitable use. I attain the objects of my invention by the apparatus shown in the accompanying drawings, in which—

Figure 1 is a front elevation of the invention; and

Fig. 2 is a section on line 2—2 of Fig. 1.

Like numerals indicate like parts in each of the several views.

Referring to the accompanying drawings, I provide a danger signal lamp 1 having a red lens 4 bearing the word "Stop" suitably displayed; a second signal lamp 2 having a lens 5 bearing the word "Right" and a figure of an index hand pointing to the right; and a third signal lamp 3 having a lens 6 bearing the word "Left" with an index hand pointing to the left, as shown in Fig. 1. Lamp 1 is affixed to lamps 2 and 3 by suitable bolts 10 and spacers 9. The lenses of the respective lamps are removably secured in place by the rims 7 and screws 8, as shown in the drawings. Lamps 2 and 3 are secured by suitable bolts 12 to upper bracket members 11. Upper bracket members 11 are adjustably mounted on lower brackets 13 by means of a suitable joint 14. Lower brackets 13 are suitably clamped by suitable members 15 to any suitable or convenient portion of the motor vehicle at the rear thereof. I provide conventional electric lamp bulbs 16 for the respective lamps, said bulbs being operatively connected with a suitably controlled source of electric current by suitable wires such as wires 18 and 19.

The light support being pivotally mounted at the point 14 permits of tilting the lamps to the desired position for throwing the light at the height desired.

What I claim is:

1. In a signal light support, a pair of upper bracket members having their lower ends bent to form a yoke, a second pair of bracket members having their upper ends mounted in the yoke of the upper bracket members, and a bolt adjustably securing the yoke end of the upper bracket members to the upper end of the lower bracket members whereby to permit of tilting adjustment of the upper bracket members relative to the lower bracket members.

2. In a signal light support, a plurality of upper bracket members having their lower ends bent to form a yoke, said bracket members being adapted to support a plurality of lamps, a plurality of lower bracket members having their upper ends mounted in the yoke of the upper bracket members, and a bolt adjustably securing the yoke to the upper end of the lower bracket members, whereby to permit of tilting adjustment of the upper bracket members relative to the lower bracket members to permit of regulating the direction of the rays of light from the lamps which the upper bracket members are adapted to support.

ROBERT E. TIMBERLAKE.